(12) United States Patent
Magouyrk et al.

(10) Patent No.: US 9,245,366 B1
(45) Date of Patent: Jan. 26, 2016

(54) LABEL PLACEMENT FOR COMPLEX GEOGRAPHIC POLYGONS

(71) Applicant: Amazon Technologies, Inc., Reno, NV (US)

(72) Inventors: Clayton Matthew Magouyrk, Seattle, WA (US); Scott Robert Parish, North Bend, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 91 days.

(21) Appl. No.: 14/147,451

(22) Filed: Jan. 3, 2014

(51) Int. Cl.
*G09G 5/00* (2006.01)
*G06T 11/60* (2006.01)

(52) U.S. Cl.
CPC ..................... *G06T 11/60* (2013.01)

(58) Field of Classification Search
CPC ....... G06T 15/005; G06T 19/00; G06T 11/00; G06T 11/60; G06T 3/4038; G06T 5/50; G06T 11/006; G06F 3/14; G06F 17/10
USPC ......... 345/418, 501, 522, 581, 619, 629, 634, 345/636, 643
See application file for complete search history.

(56) References Cited

U.S. PATENT DOCUMENTS

2009/0244095 A1* 10/2009 Bowman et al. .............. 345/629

OTHER PUBLICATIONS

ArcGIS Desktop Discussion Forums, "Reduce Polygons by Percent of Total", (2010), pp. 1-4, (available at: http://forums.esri.com/Thread.asp?c=93&f=987&t=220690) (last visited: May 19, 2015).*
Kang, Hoseok, Shoreh Elhami, and A. Saalfeld: "Using Shape Analysis for Placement of Polygon Labels", ESRI 2001 Int. User Conf., 2001 (pp. 1-6).*
Steiniger, Stefan, and Robert Weibel, "Relations and Structures in Categorical Maps", The 8th ICA Workshop on Generalisation and Multiple Representation, 2005 (pp. 1-18).*
University of Delaware, Spatial Analysis Labs (2009), Textbooks, Ch. 5: Geographic Analysis (pp. 1-7) (available at: http://www.udel.edu/FREC/spatlab/textbooks/idr_ch5.html) (last visited May 19, 2015).*
Weibel, Robert: "Generalization of Spatial Data: Principles and selected algorithms." Algorithmic foundations of geographic information systems. Springer Berlin Heidelberg, 1997, pp. 99-152.*
Maher, Margaret, "The Buffer Wizard in ArcMap", available at: http://blogs.esri.com/esri/arcgis/2009/07/15/the-buffer-wizard-in-arcmap/ (Jul. 15, 2009) (last visited; Sep. 10, 2015), pp. 1-11.*
"Buffering", Wiki.GIS.com, last modified Nov. 23, 2011. <http://wiki.gis.com/wiki/index.php/Buffering>.
"Ramer-Douglas-Peucker algorithm," Wikipedia: The Free Encyclopedia, last modified Sep. 21, 2013. <http://en.wikipedia.org/wiki/Ramer%E2%80%93Douglas%E2%80%93Peucker_algorithm>.
"How Simplify Line Works," Esri, Oct. 25, 2012. <http://resources.arcgis.com/en/help/main/10.1/index.html#//007000000046000000.

* cited by examiner

*Primary Examiner* — Xiao Wu
*Assistant Examiner* — Sarah Lhymn
(74) *Attorney, Agent, or Firm* — Seyfarth Shaw LLP; Ilan N. Barzilay; Cyrus A. Miller

(57) ABSTRACT

Embodiments of the subject technology provide for determining a set of points that form a perimeter of a polygon included in an interactive geographic map. The determined set of points of the perimeter of the polygon is reduced based on a line simplification algorithm. An area, based on the reduced set of points, of the polygon is then reduced by performing a buffering operation on the area that creates an inner buffer zone for the polygon. The subject technology determines whether an area of the inner buffer zone satisfies a predetermined threshold area. Responsive to determining that the predetermined threshold area is satisfied, a centroid of the inner buffer zone may be determined. The subject technology provides, for display to a user, a label at a coordinate position corresponding to the centroid of the inner buffer zone on the interactive geographic map.

18 Claims, 7 Drawing Sheets

LABEL PLACEMENT FOR COMPLEX GEOGRAPHIC POLYGONS

BACKGROUND

Interactive geographic maps, e.g., maps provided by a web map service, can provide a visual representation of a geographic region. An interactive geographic map for a particular geographic region can also describe various features that appear in the particular geographic region. For example, an interactive geographic map can describe line features, e.g., roads and rivers, area features, e.g., countries, parcels, forests, and lakes, and point features, e.g., villages and cities. Each feature in an interactive geographic map can be labeled, e.g., annotated, by positioning, near the feature and in the interactive geographic map, one or more labels that describe the feature. For example, an interactive geographic map that includes a point feature referencing the city of San Francisco can be labeled by placing a label "San Francisco" near the point feature.

Thus, a given interactive mapping application may need to efficiently choose what features (e.g., buildings, parks, lakes, oceans, cities, countries, etc.) to label and where to place those labels. Computerized methods can be used to automatically position respective labels near features in an interactive geographic map. These computerized methods can also apply various algorithms to optimize the placement of labels for features in an interactive geographic map. For example, various algorithms can be applied to position labels in an interactive geographic map in a manner that places such labels near or at the center of a given feature(s).

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the subject technology may overcome one or more deficiencies experienced in existing approaches to providing labels on an interactive geographic map in an electronic environment.

In various embodiments, the subject technology can assign labels corresponding to respective features in a particular geographic region. In an embodiment, the term "label" may refer to data including text, icon and/or other graphical data that is utilized and displayed in an interactive geographical map to describe and/or provide contextual information to one or more features included in a geographic area or region displayed in the interactive geographical map. Some examples of such features may include, but are not limited to, buildings, places of business, roads, parks, historic sites, public or private transportation venues, airports, bodies of water, cities, countries, various points of interest, etc. An end user operating a client computing device can request, from a map search system, an interactive geographic map for a particular geographic region in one example. In response, the map search system can provide the client computing device with map data that describes the geographic region and that includes a set of labels that each describe a feature (e.g., using a text label, icon and/or graphical data) that is located in the geographic region. In some embodiments, the client computing device can generate, using the map data and one or more selected labels, and provide for display the interactive geographic map that describes a visual representation of a map for the geographic region.

Each label displayed, in some examples, should have a sufficient amount of display space in the interactive geographic map to ensure the readability of the labels placed on the interactive geographic map. For example, a label needs to be placed in the interactive geographic map so that the label appears within a portion of a given feature that is sensible to a user. By way of example, a user would generally prefer to view a label in a "center" of a given geographic object (e.g., a polygon) displayed on the interactive geographic map. However, in some cases, such placement of a label in the center of the object would result in an unexpected or undesired result (such as placement of the label outside the object or within a boundary of another adjacent or close in proximity object).

The subject technology, in some embodiments, therefore provides for placement of a given label on an arbitrarily complex geographical polygon (e.g., a state, body of water, country etc.) based on techniques described herein that produces a representation of a geographic region that is more accurately labeled in a manner expected by a user. Other advantages, variations, and functions are described and suggested below as may be provided in accordance with the various embodiments.

Figure 1:
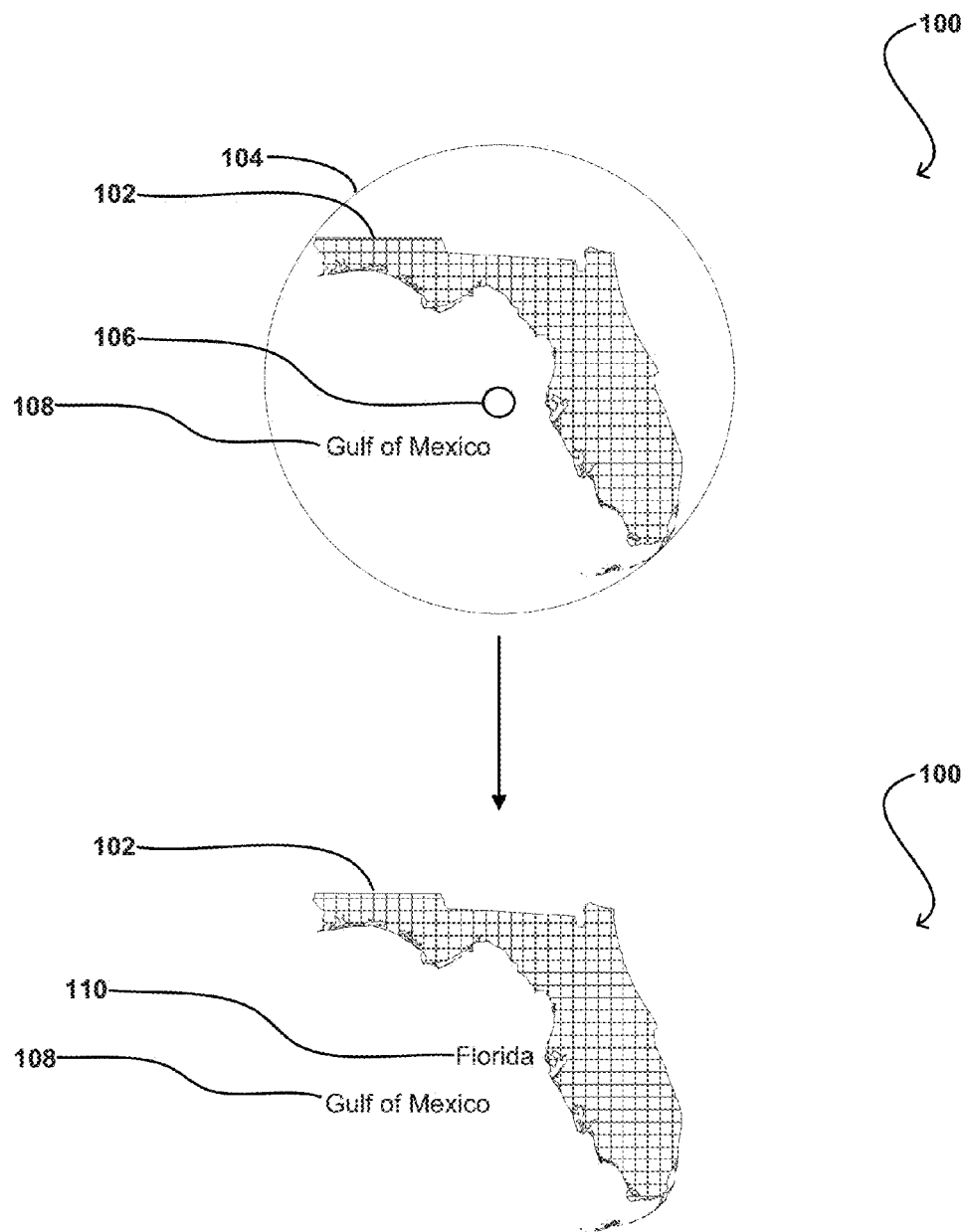
FIG. 1 conceptually illustrates an example in different stages for placing a label on a polygon corresponding to a geographic feature provided by an interactive geographic map.

FIG. 1 conceptually illustrates an example in different stages for placing a label on a polygon 102 corresponding to a geographic feature provided by an interactive geographic map 100. Examples of different geographic features may include, but not limited to, cities, states, counties, countries, bodies of water, streets, buildings, highways, bridges, airports, railroads, buildings, dams, reservoirs, or any other suitable type of object that could be included on a geographic map. In some embodiments, the interactive geographic map 100 is displayed on a display screen of a computing device. The polygon 102 was rendered using, for example, map data that was received from a map search system, as described in reference to FIG. 6 below. More specifically, FIG. 1 illustrates an example of determining a position for placing a label corresponding to an irregular polygon (e.g., where not all sides of the polygon are equal in length and not all interior angles are equal).

As illustrated in the example of FIG. 1 in a first stage, the polygon 102 corresponding to a geographic feature representing the state of Florida in the United States is provided on the interactive geographic map 100. A circle 104 is utilized to calculate a centroid 106 for the polygon 102 for determining a position for placing a label on the interactive geographic map 100. In an embodiment, the term "centroid" may refer to an arithmetic mean ("average") position of all points in a shape (e.g., polygon). In informal terms, the centroid may be understood as a point at which a cardboard cut-out of a polygon could be perfectly balanced on the tip of a pencil (assuming uniform density and a uniform gravitational field). Also illustrated in the interactive geographic map 100 is a label 108 corresponding to the "Gulf of Mexico."

As shown in a second stage of FIG. 1, a label 110 corresponding to "Florida" is placed on the interactive geographic map 100 based on the location provided by the centroid 106. However, based on the position of the centroid 106, the label 110 is placed in close proximity to the label 108 for the "Gulf of Mexico." Consequently, a user viewing the interactive geographic map 100 may be confused based on the position of the labels 108 and 110.

Figure 2:
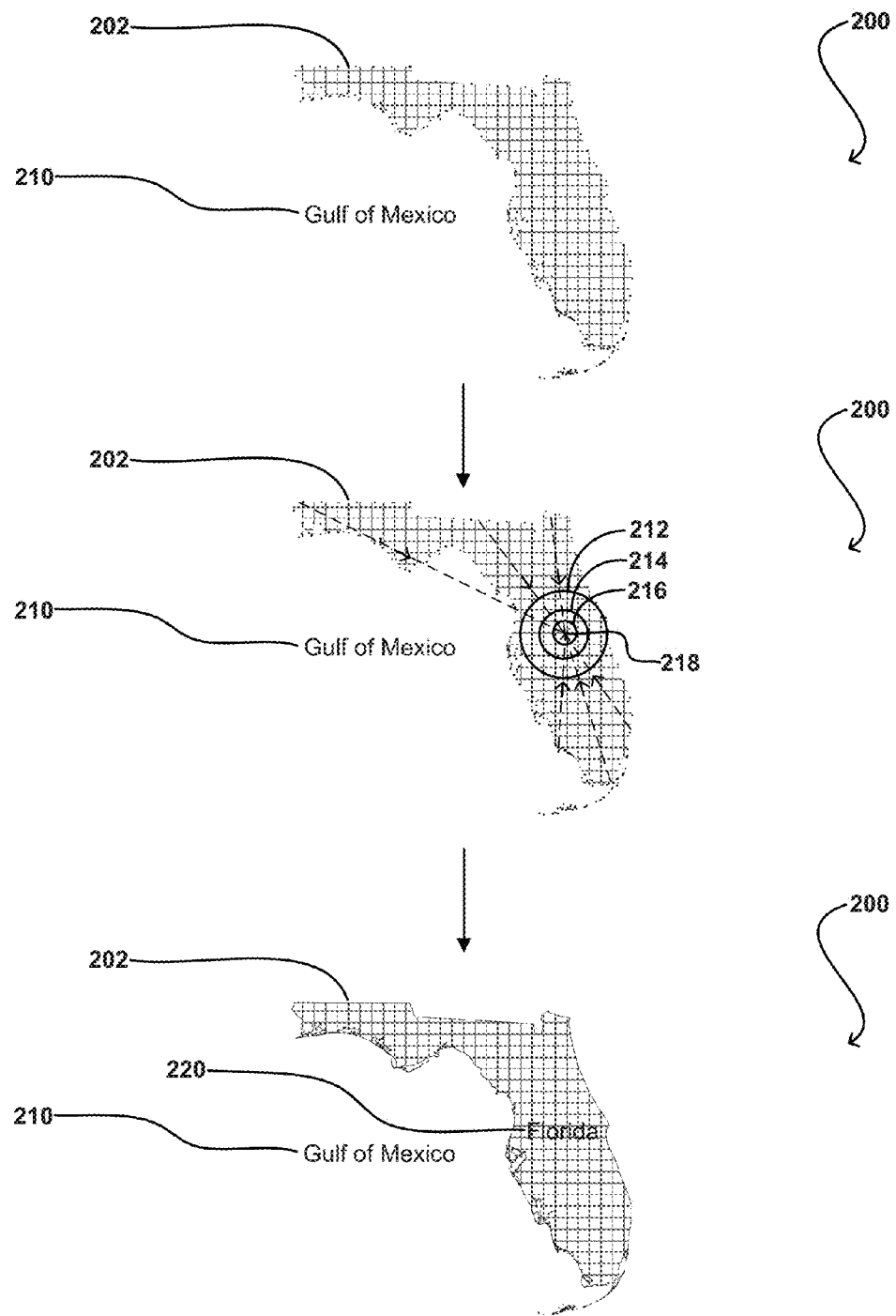
FIG. 2 conceptually illustrates an example in different stages for placing a label on a polygon corresponding to a geographic feature provided by an interactive geographic map.

FIG. 2 conceptually illustrates an example in different stages for placing a label on a polygon 202 corresponding to a geographic feature provided by an interactive geographic map 200. In some embodiments, the interactive geographic map 200 is displayed on a display screen of a computing device. The polygon 202 was rendered using, for example, map data that was received from a map search system, as described in reference to FIG. 6 below. More specifically, FIG. 2 illustrates an example, simplified for the purpose of clarity, for determining a position for placing a label corresponding to an irregular polygon by utilizing an iterative buffering technique described below.

As illustrated in the example of FIG. 2 in a first stage, the polygon 202 corresponding to a geographic feature representing the state of Florida is provided on the interactive geographic map 200. Also illustrated in the interactive geographic map 200 is a label 210 corresponding to the "Gulf of Mexico."

Calculating a centroid of the polygon 202 may involve, in some cases, taking an arithmetic mean of the respective positions of each of the set of points around a perimeter of the polygon 202. In an embodiment, the term "perimeter" may refer to a distance around an outer boundary of a given polygon (e.g., based on an aggregate distance of a set of edges or lines that form the outer boundary of the polygon). The aforementioned calculation, however, may be simplified by utilizing a Ramer-Douglas-Peucker algorithm ("Douglas-Peucker algorithm") for reducing a number of points in a curve that is approximated by a series of points. In this example, such a curve corresponds to the perimeter of the polygon 202 that includes an initial series of points before the Douglas-Peucker algorithm is performed. As shown in FIG. 2, the polygon 202 includes a finite set of n points, reduced by applying the Douglas-Peucker algorithm, forming a perimeter of the polygon 202.

In some embodiments, the Douglas-Peucker algorithm may be implemented based on the following example. First, for a subset of points that form a perimeter of a given polygon, the algorithm begins by connecting respective endpoints of a line, formed by the subset of points, with a second line indicating the general course of a set of points. In a simple example, the second line could be formed by connecting the two endpoints (e.g., the first and last points) of the subset of points. By way of example, for a given P number of points, the second line signifies a direction that the P number of points are heading toward. For instance, assuming a Cartesian coordinate system for the sake of illustration, if a first endpoint of the P number of points is at coordinate (0,0), and each subsequent point is located at a position that increments the x and y coordinates by 1 so that a second endpoint (e.g., the last point) has a coordinate of (P, P), then the second line can be formed by a respective line that connects the first endpoint at (0,0) with the second endpoint at coordinate (P, P). The distance of each vertex or point to the second line is then measured perpendicularly. Based on this measured distance, vertices or points closer to the second line than a given tolerance distance (e.g., within the tolerance distance) are eliminated or removed (e.g., discarded) from the subset of points. The line is then divided by the vertex farthest from the second line, which makes two new lines. The remaining vertices or points are measured against these new lines, and the process continues until all vertices within the tolerance distance are eliminated. The above steps may be repeated for each remaining subset of points from the set of points that form the perimeter of the polygon.

As shown in a second stage of FIG. 2, a buffering process may be performed iteratively on the polygon to determine a centroid of the polygon 202. In an embodiment, the term "buffer" or "buffering" refers to a process that creates a zone of specified distance (called a "buffer zone") around features such as point, line or polygon features, etc., by increasing or decreasing an area of a given geometry (e.g., the polygon 202) by a radial distance value. Such a buffer zone of a polygon may be outside (e.g., an outer buffer when increasing the area of the polygon by a positive radial distance value) or inside (e.g., an inner buffer when decreasing the area of the polygon by a negative radial distance value) the polygon. In the example shown in FIG. 2, one or more inner buffer zones ("buffers") are created to extend, radially, inside from the perimeter of the polygon 202. In some embodiments, instead of a radial distance value, a set of distance values may be used to buffer a polygon. For instance, in an example of a square or rectangle polygon, a set of distance values, extending inward, from a point from each edge of the square or rectangle polygon may be used to form an inner buffer.

Assuming that the aforementioned set of points n represent the perimeter of the polygon 202, a point at a coordinate position 218 (e.g., $(C_x, C_y)$) may be determined based on a set of buffers 212, 214 and 216 that radially extend, respectively, from various points (with respective $(x_n, y_n)$ coordinates) from the perimeter of the polygon 202 at respective distances. It should be appreciated that the set of buffers 212, 214 and 216 represent only a subset of buffers that may be utilized in some examples and that the set of buffers illustrated in FIG. 2 are limited in number for the sake of visual clarity. Further, although each of the buffers shown in FIG. 2 is represented as respective circle shapes, it should be understood that this choice of shape was utilized to simplify the illustration of FIG. 2. In practice, each of the buffers can mimic an entirety (or portion) of the shape of the initial polygon 202, with each subsequent buffer having a smaller area than a preceding buffer. In some embodiments, each of the buffers can have an arbitrary shape (e.g., polygons, circles, ellipses, etc.).

In one example, an initial inner buffer may be created by a function based on dividing an area of the polygon 202 by the perimeter of the polygon 202 that determines a radial distance value for reducing the area of the polygon 202. Similarly, a subsequent buffer that decreases in area can be created by dividing an area of a preceding inner buffer by the perimeter of the preceding inner buffer to determine a subsequent radial distance value to reduce the area of the preceding inner buffer.

This set of operations can be repeated until a threshold area criteria of a given inner buffer is satisfied. The threshold area criteria may include a value of a minimum area in which buffering the area of the polygon 202 may cease. For example, when the area of the inner buffer is sufficiently small, the area of the inner buffer may be at a position close to the center of the polygon 202. Thus, when an area of a given inner buffer is below, equal to, or within a ± percentage or amount of the value of the minimum area, an additional buffering operation(s) may not be performed. For instance, in some embodiments, the threshold area is 1 square meter (when an area of a respective inner buffer is expressed in an amount of square meters). It should be appreciated that other types of units may be utilized to represent an area of a given buffer and/or threshold area and still be within the scope of the subject technology.

In the example of FIG. 2, the buffer 212 represents a preceding buffer to the subsequent buffer 214. Similarly, the buffer 214 represents a preceding buffer to the subsequent buffer 216. As shown, the buffer 212 has a greater area than the buffer 214 which has a greater area than the buffer 216. The buffer 216, in this example, satisfies a given threshold area criteria and, as a result, the iterative buffering process may cease after creating the buffer 216. A position of a centroid or center of a geometry corresponding to the buffer 216 may then be utilized as a coordinate to place a label for the feature corresponding to the polygon 202.

As shown in a third stage of FIG. 2, a label 220 corresponding to "Florida" is placed on the interactive geographic map 200 at the coordinate position 218 within the polygon 202. In this manner, the label 220 (in contrast to the label 110 shown in FIG. 1) is shown at a position that is expected by a user and accurately corresponds to the (irregular) polygon 202.

Figure 3:
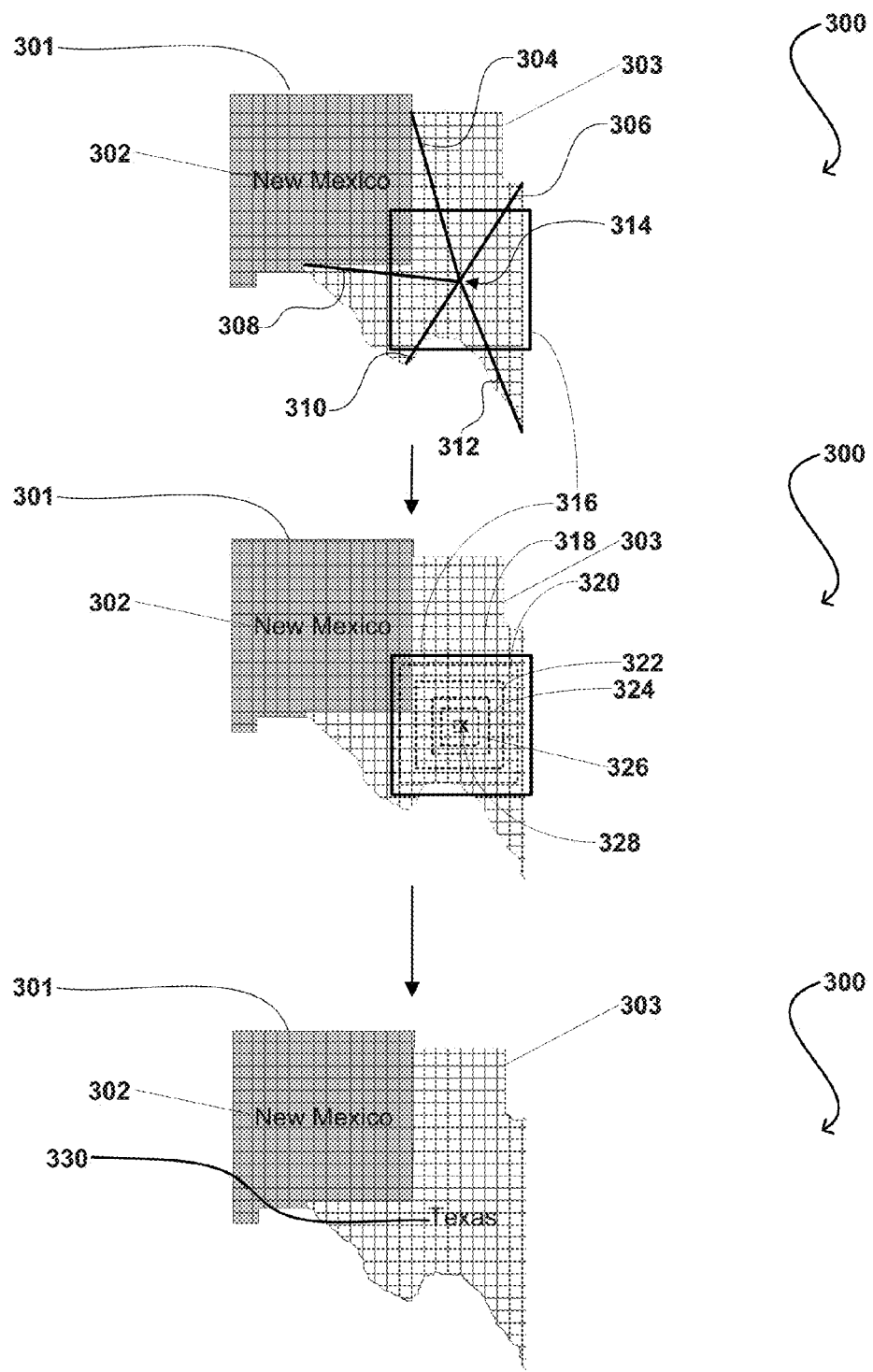
FIG. 3 conceptually illustrates an example in different stages for placing a label on a polygon corresponding to a portion of a given geographic feature provided by an interactive geographic map.

FIG. 3 conceptually illustrates an example in different stages for placing a label on a polygon 303 corresponding to a portion of a given geographic feature provided by an interactive geographic map 300. In some embodiments, the interactive geographic map 300 is displayed on a display screen of a computing device. The polygon 303 was rendered using, for example, map data that was received from a map search system, as described in reference to FIG. 6 below. More specifically, FIG. 3 illustrates an example, simplified for the purpose of clarity, for determining a position for placing a label corresponding to an irregular polygon by utilizing a "cutout" technique described below.

In a first stage of FIG. 3, the interactive geographic map 300 includes a polygon 301 and a polygon 303. Further shown is a label 302 for "New Mexico" placed within the polygon 301. In some cases, as a user is panning or moving around the interactive geographic map 300, a given geographic feature may be partially displayed. For instance, the polygon 303 corresponds to the state of Texas in the United States. However, only a portion of the state of Texas corresponding to the polygon 303 is shown for display in a current frame of the interactive geographic map 300. In some examples, a given label may be placed in a portion of polygon that is not visible in a currently displayed frame of an interactive geographic map. A user, therefore, would be required to move or pan the interactive map in a particular direction in order to view such a label.

In order to place a label corresponding to the partially displayed polygon 303 (e.g., to avoid requiring the user to move the interactive geographic map to view a label not shown in the current frame), the subject technology in some embodiments may determine a coordinate position 314 based on a set of lines 304, 306, 308, 310 and 312 that intersects at the coordinate position 314, which (approximately) corresponds to an optimal (e.g., "best") position for creating a cutout tile boundary (discussed in further detail below) for the polygon 303. In some embodiments, the set of lines 304, 306, 308, 310 and 312 corresponds to respective points from a perimeter of the polygon 303 (assuming that the perimeter of the polygon is formed from a finite set of points) that extend inside the polygon 303. It should be appreciated that the set of lines shown in FIG. 2 may represent a subset of a total number of lines (e.g., corresponding to respective points of the perimeter that extend inside the polygon 303) that are utilized to determine the coordinate position 314. Further, in some embodiments, fewer lines may be utilized to determine the coordinate position 314.

Alternatively, a given set of points inside of a polygon may be randomly selected, and a respective point from among the randomized points may be selected that has the best edge distance (e.g., longest) from the perimeter (e.g., a nearest edge) of the polygon. Other techniques may be utilized to determine an optimal point for creating a cutout tile boundary for a partially displayed polygon and still be within the scope of the subject technology.

Based on the coordinate position 314, a shape 316 corresponding to a "cutout" tile boundary 316 in a shape of a square may be created in which each of the edges of the cutout tile boundary 316 may be equidistance from the coordinate position 314 in some embodiments. The cutout tile boundary 316 is utilized, in some examples, to segment or include only a portion of the area of the polygon 303, which may be made up of a set of respective tiles (or similar shapes). In a second stage of FIG. 3, an iterative buffering process is performed by utilizing the cutout tile boundary 316 as described further below.

Assuming that a finite set of points n represent the perimeter of the cutout tile boundary 316, a point at a coordinate position 328 (e.g., $(C_x, C_y)$) may be determined based on a set of buffers 318, 320, 322, 324 and 326 that radially extend, respectively, from various points (with respective $(x_n, y_n)$ coordinates) from the perimeter of the cutout tile boundary 316 at respective distances. As discussed before, a Douglas-Peucker algorithm may be utilized to reduce a set of points that form the perimeter of a given shape such as the cutout tile boundary 316. It should be appreciated that the set of buffers 318, 320, 322, 324, 326 and 328 represent only a subset of buffers that may be utilized in some examples and that the set of buffers illustrated in FIG. 3 are limited in number for the sake of visual clarity. Further, although each of the buffers shown in FIG. 3 are represented as respective square shapes, other types of shapes may be utilized and still be within the scope of the subject technology. Each of the buffers 318, 320, 322, 324, 326 and 328 represent respective buffers, created in a sequence, in which a respective preceding buffer has a larger area than a subsequent buffer.

In some embodiments, an initial inner buffer may be created by a function based on dividing an area of the cutout tile boundary 316 by the perimeter of the cutout tile boundary 316 to determine a radial distance value for decreasing the area of the cutout tile boundary 316. A subsequent buffer that decreases in area can be created by dividing an area of a preceding buffer by the perimeter of the preceding buffer to determine a subsequent radial distance value for decreasing the area of the preceding buffer. This set of operations can be repeated until a threshold area criteria of a given buffer is satisfied. For instance, in some embodiments, the threshold area is 1 square meter (e.g., when an area of a respective buffer is expressed in an amount of square meters). It should be appreciated that other types of units may be utilized to represent an area of a given buffer and/or threshold area and still be within the scope of the subject technology.

The buffer 328, in the example of FIG. 3, satisfies a given threshold area criteria and, as a result, the iterative buffering process may cease after creating the buffer 328. A coordinate position of a centroid or center of a geometry corresponding to the buffer 328 may then be utilized to place a label for the feature corresponding to the partially displayed polygon 303.

As shown in a third stage of FIG. 3, a label 3300 corresponding to "Texas" is placed on the interactive geographic map 300 at the aforementioned coordinate position, corresponding to the centroid or center of the buffer 328, within the polygon 303. In this manner, the label 330 is shown at a position that does not require a user to pan the interactive geographic map 300 in order to show the remaining portion of the partially displayed polygon 303.

Although the example of FIG. 3 relates to a cutout tile boundary for a partially displayed (and irregular) polygon, it should be appreciated that a cutout tile boundary may be utilized for a fully displayed polygon and/or other types of polygons and still be within the scope of the subject technology.

Figure 4:
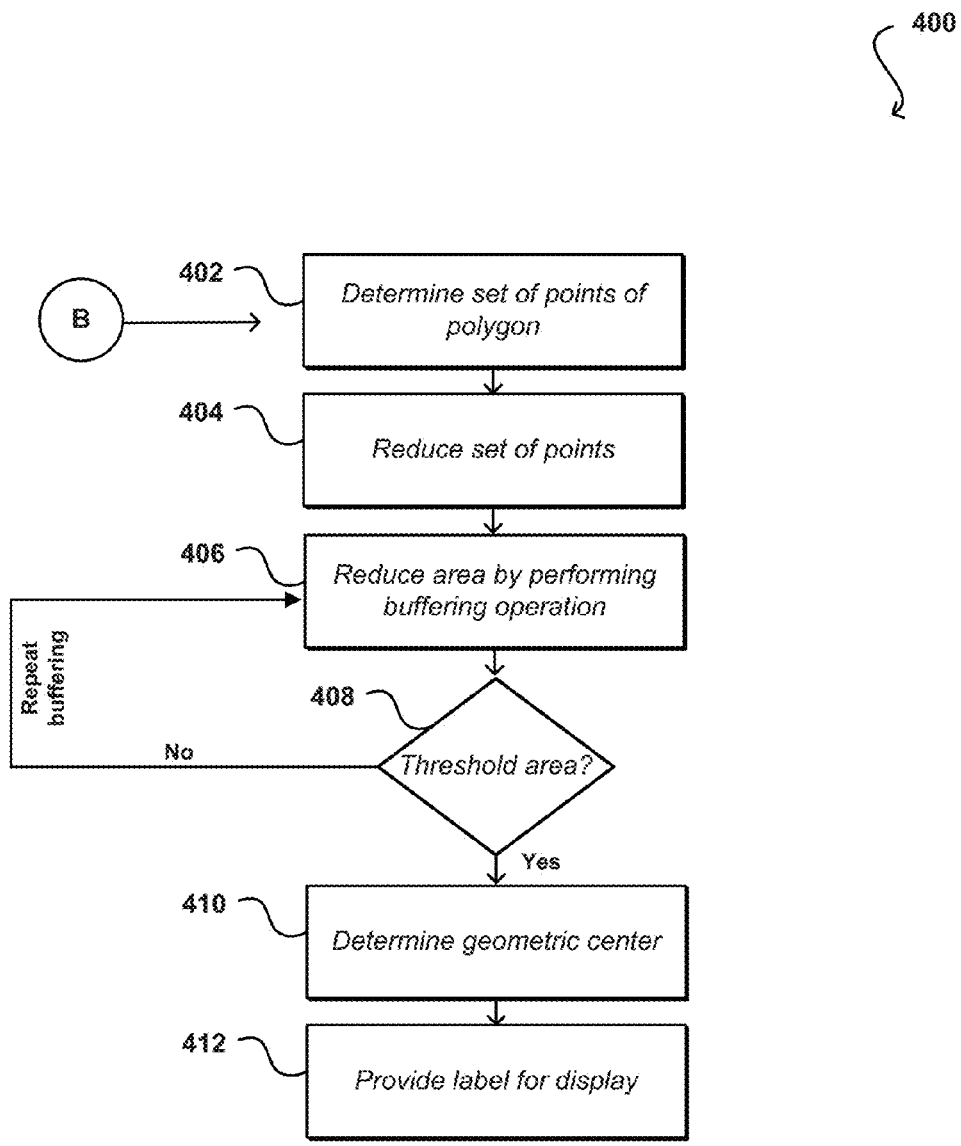
FIG. 4 illustrates steps of an example process for performing a buffering technique on a polygon to place a label for the polygon that can be used in accordance with some embodiments of the subject technology.

FIG. 4 illustrates steps of an example process 400 for performing a buffering technique on a polygon to place a label for the polygon that can be used in accordance with some embodiments of the subject technology. In some embodiments, the process 400 may be implemented by one or more computing devices or systems.

At step 402, a set of points comprising a perimeter of a polygon is determined. In some embodiments, the polygon corresponds to a feature provided in an interactive geographic map. The perimeter, in some embodiments, represents a distance of a set or sequence of edges or lines that form a boundary or shape of the polygon, in which the set of edges or lines is formed from a finite set of points. Some types of polygons (e.g., a plane figure that is bounded by a finite chain of straight line segments closing in a loop to form a closed chain or circuit) may be regular (e.g., where all corners lie on a single circle and all edges are of the same length), irregular (e.g., where the polygon does not have all sides equal and all interior angles equal), convex, non-convex, cyclic, equilateral and/or a combination of any of the aforementioned types of polygons.

At step 404, the set of points is reduced by utilizing a line simplification algorithm. The line simplification algorithm, in some examples, removes extraneous bends and small/minor intrusions and extrusions from a set of lines without destroying the essential shape of the set of lines. Given a set of points of a set or sequence of lines that form a perimeter of a polygon, the line simplification algorithm seeks to reduce the set of points and still substantially represent an overall shape of the polygon. In some embodiments, the line simplification algorithm may be a Douglas-Peucker algorithm discussed before. It is appreciated that another technique may be utilized to reduce the set of points and still be within the scope of the subject technology.

At step 406, an area of the polygon based on the reduced set of points is reduced by performing a buffering operation on the area of the polygon. As discussed before, a buffering operation(s) creates a zone of specified distance ("buffer zone") around features such as point, line or polygon features, etc., by increasing or decreasing an area of a given polygon by a radial distance value. In this regard, an inner buffer zone, which reduces the area of the polygon, is created to extend, radially, inside from the perimeter (e.g., formed from the reduced set of points) of the polygon. In one example, an initial inner buffer zone may be created by a function based on dividing an area of the polygon by a perimeter of the polygon that determines a radial distance value for reducing the area of the polygon.

At step 408, it is determined whether the area of the inner buffer zone meets a predetermined threshold area. In some embodiments, the predetermined threshold area is 1 square meter. If the threshold area is not met, the process 100 may continue back to step 106 to repeat the steps for performing the buffering operation to further reduce the area of the polygon. In this regard, a subsequent buffer zone that decreases in area can be created by dividing an area of a preceding inner buffer zone by the perimeter of the preceding inner buffer zone to determine a subsequent radial distance value to reduce the area of the preceding inner buffer zone. This subsequent buffer zone is then checked to see whether its area meets the predetermined threshold area and the buffering operation repeats until the threshold area criteria is satisfied.

Alternatively, if the threshold area criteria is satisfied, at step 110, a centroid or geometric center of an (reduced) area corresponding to the current inner buffer zone (e.g., with respect to a current iteration of the buffering operation) is determined. In some embodiments, the centroid corresponds to a coordinate position (e.g., (x,y)) on the interactive geographic map.

At step 410, a label corresponding to the polygon is provided for display on the interactive geographic map based on the centroid. The process 400 then ends.

Figure 5:
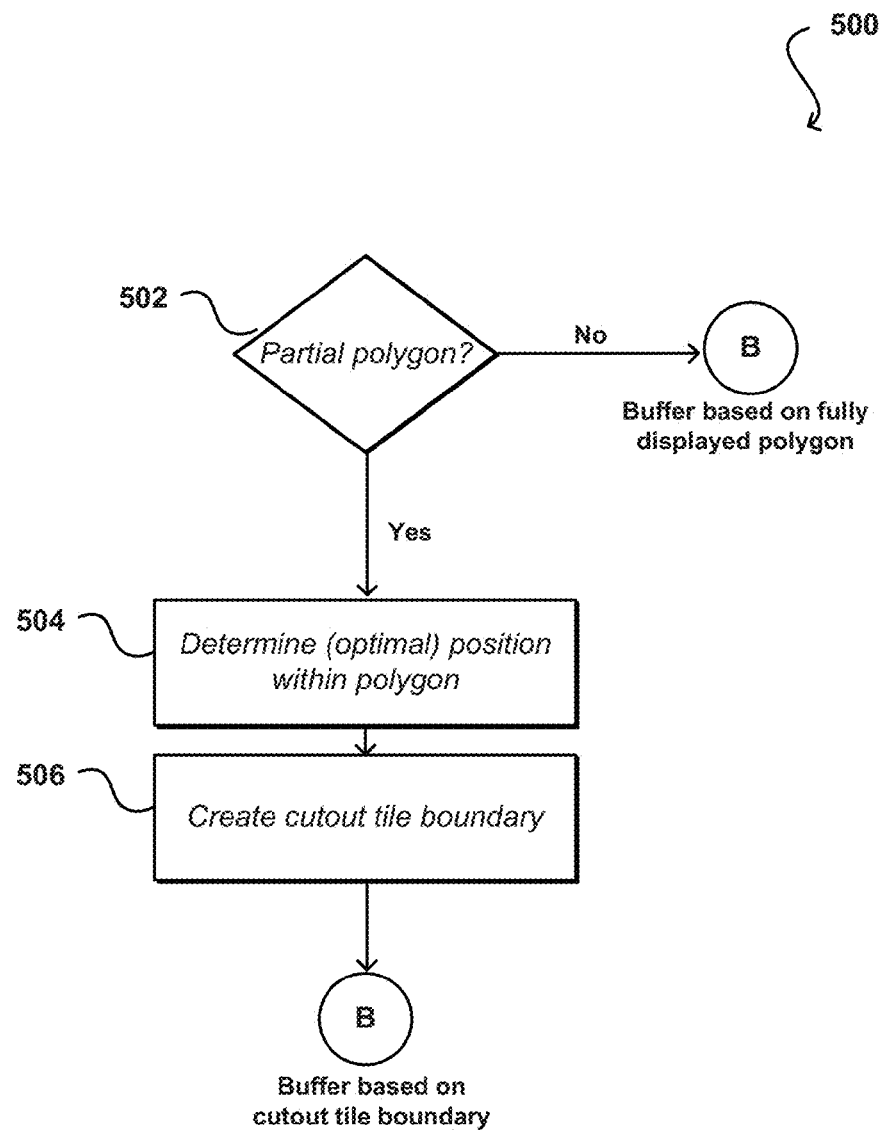
FIG. 5 illustrates steps of an example process for determining a cutout tile boundary for that can be used in accordance with some embodiments of the subject technology.

FIG. 5 illustrates steps of an example process 500 for determining a cutout tile boundary for that can be used in accordance with some embodiments of the subject technology. In some embodiments, the process 500 may be implemented by one or more computing devices or systems. Additionally, the process 500 may be performed in conjunction with the process 400 described in FIG. 4. More specifically, FIG. 5 provides an example process that may be utilized when encountering a partially displayed polygon on the interactive geographic map. In some embodiments, after a cutout tile boundary is determined for a given polygon in the process 500 of FIG. 5, the steps described in the process 400 of FIG. 4 in connection with a buffering operation may be performed for the cutout tile boundary.

At step 502, it is determined whether a partially displayed polygon is provided in a current frame of an interactive geographic map. If not, the process 500 continues to perform a set of operations related to an iterative buffering operation as described by reference in FIG. 4 (as indicated by an arrow to "B" which continues at step 402 in FIG. 4).

At step 504, responsive to determining that the partially displayed polygon is provided, a coordinate position within the polygon is determined. As discussed before, this coordinate position may be determined based on one or more techniques. In some embodiments, the subject technology determines the coordinate position based on a set of lines that intersect at the coordinate position, which (approximately) corresponds to an optimal (e.g., "best") position for creating a cutout tile boundary for the polygon. For instance, the set of lines corresponds to respective points from a perimeter of the polygon (assuming that the perimeter of the polygon is formed from a finite set of points) that extends inside the polygon. Alternatively, a given set of points inside of the polygon may be randomly selected, and a respective point from among the randomized points may be selected that has the longest or largest edge distance from the perimeter (e.g., a nearest edge) of the polygon. Other techniques may be utilized to determine an optimal point for creating a cutout tile boundary and still be within the scope of the subject technology.

Based on the coordinate position, a shape corresponding to the cutout tile boundary may be created in step 506. In some embodiments, the shape is a square in which each of the edges of the cutout tile boundary may be equidistance from the coordinate position. The cutout tile boundary is utilized, in some examples, to segment or include only a portion of the area of the polygon, which may be made up of a set of respective tiles (or similar shapes).

The process 500 then continues to perform an iterative buffering process (as indicated by an arrow to "B" which continues at step 402 in FIG. 4) by utilizing the cutout tile boundary as described by reference to the steps shown in FIG. 4 in further detail below.

Referring back to step 402 of FIG. 4, a set of points forming a perimeter of the cutout tile boundary may be determined. By reference to step 404 of FIG. 4, the set of points of the cutout tile boundary may be simplified by utilizing a line simplification algorithm (e.g., a Douglas-Peucker algorithm) to reduce the set of points that form the perimeter of the cutout tile boundary. Referring back to step 406, an area of the cutout tile boundary based on the reduced set of points is reduced by performing a buffering operation on the area of the cutout tile boundary. In this regard, an inner buffer zone, which reduces the area of the cutout tile boundary, is created to extend, radially, inside from the perimeter (e.g., formed from the reduced set of points) of the cutout tile boundary. In one example, an initial inner buffer zone may be created by a function based on dividing an area of the cutout tile boundary by a perimeter of the cutout tile boundary to determine a radial distance value for decreasing the area of the cutout tile boundary.

By reference to step 408 of FIG. 4, an area of the inner buffer zone of the cutout tile boundary is checked to determine whether the area meets a threshold area. For instance, in some embodiments, the threshold area is 1 square meter (e.g., when an area of a respective buffer is expressed in an amount of square meters). If the threshold area is not met, a subsequent buffer zone that decreases in area can be created by dividing an area of a preceding buffer zone by the perimeter of the preceding buffer zone to determine a subsequent radial distance value for decreasing the area of the preceding buffer zone. This set of operations can be repeated until a threshold area criteria of a current inner buffer zone is satisfied. For instance, in some embodiments, the threshold area is 1 square meter (e.g., when an area of a respective buffer is expressed in an amount of square meters).

Responsive to the threshold area being met, by reference to step 410, the iterative buffering process may cease. Referring to step 410 of FIG. 4, a coordinate position of a centroid or center of a geometry corresponding to the current inner buffer zone of the cutout tile boundary is determined. Then, by reference to step 412, a label corresponding to the aforementioned polygon is provided for display on the interactive geographic map based on the centroid.

Although the above example discusses a partially displayed polygon, it should be understood that the process 500 may be utilized (e.g., starting at step 504) for other types of polygons and still be within the scope of the subject technology.

Figure 6:
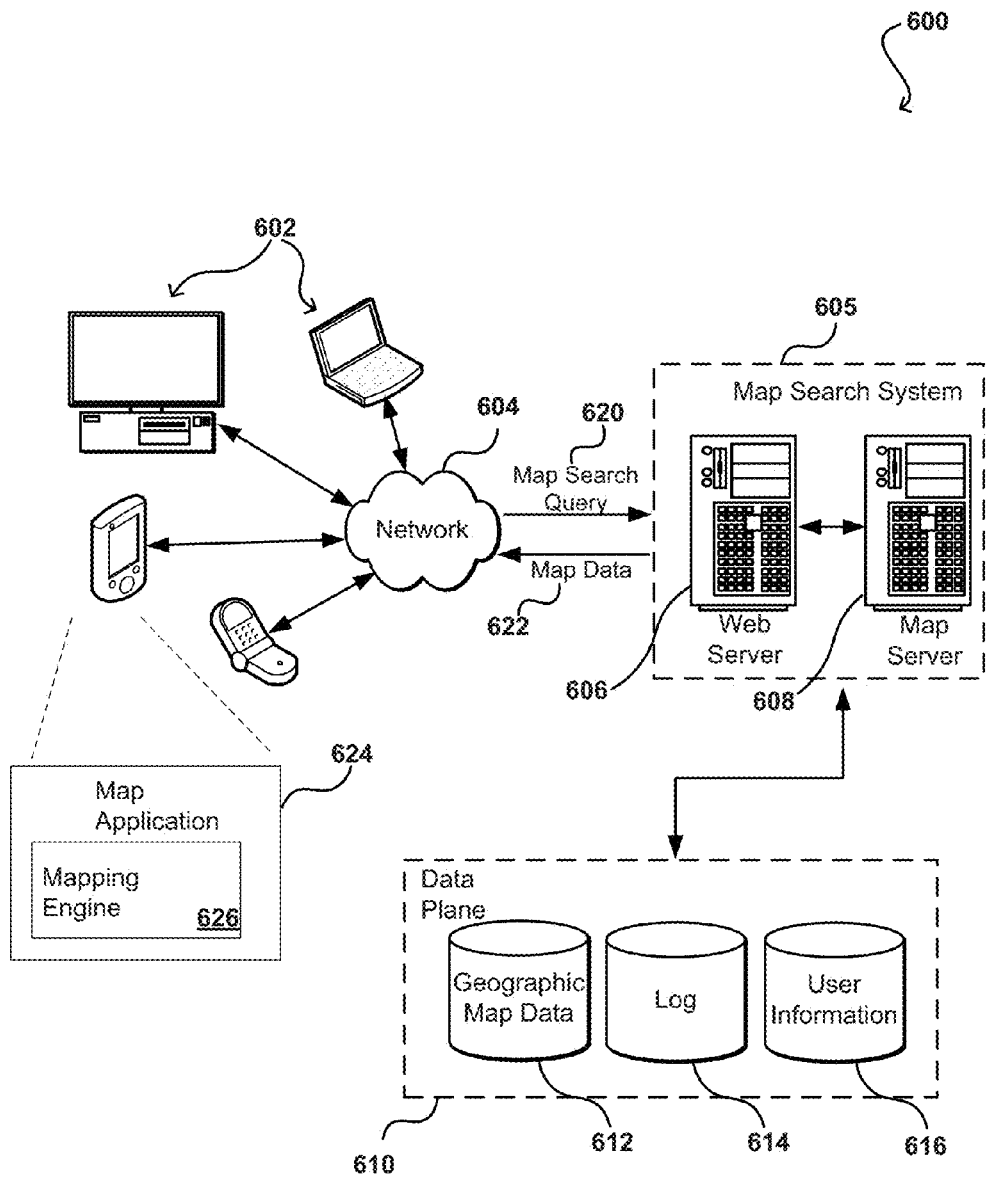
FIG. 6 illustrates an environment in which various embodiments can be implemented.

FIG. 6 illustrates an example of an environment 600 for implementing aspects in accordance with various embodiments. Although a web-based environment is described for purposes of explanation, different environments may be used, as appropriate, to implement various embodiments.

The example environment 600 includes a map search system 605 and a data plane 610. The map search system 605 includes at least one web server 606 and at least one map server 608, as described below. The map search system 605 is an example of an interactive geographic map retrieval system implemented as computer programs on one or more computers in one or more locations, in which the systems, components, and techniques described below can be implemented.

A user can interact with the map search system 605 through a client device 602. For example, the client device 602 can be a computer coupled to the map search system 605 through a data communication network 604, e.g., the Internet. In some instances, the map search system 605 can be implemented on the client device 602, for example, through a software application executing on the client device 602. The client device 602 generally includes a memory, e.g., a random access memory (RAM), for storing instructions and data, and a processor for executing stored instructions. The client device 602 can be any appropriate device operable to send and receive requests, messages, or other types of information over the network 604. The client device 602 can also include a display screen though which a user interacting with the client device can view information, e.g., interactive geographic maps. Some examples of client devices include personal computers, cellular phones, handheld messaging devices, laptop computers, set-top boxes, personal data assistants, electronic book readers, tablet devices, and the like.

The network 604 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network will not be discussed herein in detail. The client device 602 can communicate over the network using wired or wireless connections, and combinations thereof.

A user can use the client device 602 to submit a map search query 620 to the map search system 605. The map search query 620 can request an interactive geographic map for a particular geographic region that is identified by a geographic address, e.g., a street address, city, state, zip code, geographic coordinates, or a name of a point of interest. When the user submits the map search query 620, the query 620 may be transmitted through the network 604 to a map server 608 within the map search system 605. The map server 608 responds to the query 620 by using, for example, the geographic map data 612, to identify map data 622 describing a geographic region that satisfies the query 620. The map server 608 sends the map data 622 through the network 604 to the client device 602 for presentation to the user.

The map data 622 can include data describing a map of the particular geographic region. The map data 622 can be used, for example, by a client device 602, to generate an interactive geographic map that provides a visual, e.g., two-dimensional or three-dimensional, representation of the particular geographic region.

The map data 622 can describe the map of the particular geographic region using, for example, a set of map tiles at a specified zoom level. For example, in response to a map search query for the city of San Francisco, the map server 608 can identify a set of map tiles that collectively describe a map of the city of San Francisco at a specified zoom level. Each map tile in the set visually describes a portion of the map of San Francisco at the specified zoom level. Different types of maps of a geographic region may be provided depending on the user's selection including, for example, road maps, satellite maps, a hybrid map, e.g., a combination of normal and satellite views, or physical maps based on terrain information.

Further, the map data 622 can also include a set of labels, e.g., text labels, icons, or both, for the requested geographic region. Each label can describe a feature that is located in the requested geographic region. Some examples of features include line features, e.g., roads and rivers, area features, e.g., countries, parcels, forests, and lakes, and point features, e.g., cities and points of interest. The map data 622 can also include, for each label, respective coordinates that specify a location at which the label is to be positioned in an interactive geographic map. Coordinates for labels can be specified by a user, e.g., a cartographer, or may be generated by the map server 608. For example, a label "San Francisco" can be assigned coordinates so that the label is positioned in a centrally located map tile in a set of map tiles for the city of San Francisco.

After receiving the map data 622 from the map server 608, and through the network 604, a software application, e.g., web browser or a map application 624, running on the client device 602 renders an interactive geographic map for the requested geographic region using the map data 622. For example, a mapping engine 626 in the map application 624 can position map tiles, in a set of map tiles describing the requested geographic region, for display on a display screen of the client device 602. Additionally, the mapping engine 626 can evaluate the map data 622 to select labels to be displayed in the interactive geographic map. In some embodiments, the mapping engine 626 may be implemented to utilize, in addition to or alternatively to a central processing unit (CPU), a graphical processing unit (GPU) provided by the client device 602.

The map data 622 generally includes a set of the labels that can potentially be placed in the interactive geographic map for the requested geographic region. For each frame (e.g., corresponding to a graphical image representing a geographic map for the requested geographic region), all labels that can be displayed (e.g., within a viewport or viewing region of an application executing on the computing device) are processed by the mapping engine 626 for display in the interactive geographic map. In some embodiments, the mapping engine 626 can select and place labels for display in the interactive geographic map according to the embodiments described in FIGS. 1-5.

In some instances, after labels have been displayed in an interactive geographic map, as described above, a user operating the client device 602 can reposition the interactive geographic map, for example, by interacting with the client device 602, e.g., by dragging or scrolling the interactive geographic map in a particular direction. In response to the repositioning, the interactive geographic map can be updated with a new frame that describes a different geographic region. The interactive geographic map for the different geographic region may still display labels that were selected for the previously displayed geographic. In such instances, the map application 624 discards and replaces labels that are partially displayed in the interactive geographic map with different labels. In some embodiments, depending on the current frame of the interactive geographic map, the mapping engine 626 can select and place labels for display in the interactive geographic map according to the embodiments described in FIGS. 1-5 as mentioned before.

In some embodiments, the web server 606, map server 608, and similar components, can be considered to be part of the data plane 610. The handling of all requests and responses, as well as the delivery of content between the client device 602 and the map server 608, can be handled by the web server 606. The web server 606 and map server 608 are merely example components. However, it should be appreciated that more or fewer components can be used as structured code that can be executed on any appropriate device or host machine as discussed elsewhere herein. For instance, in some cases, a content delivery network may be utilized instead of (or in addition to) the aforementioned web server and/or map server. A content delivery network, in some examples, may be provided as a distributed system of servers deployed in one or more data centers across the Internet. In this regard, a map tile and/or map data generation process may be utilized to provide respective map tiles which are then delivered via the content delivery network to one or more client devices.

The data plane 610 includes one or more resources, servers, hosts, instances, routers, switches, data stores, other similar components, or a combination thereof. The resources of the data plane 610 are not limited to storing and providing access to data. Indeed, there may be several map servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 610 can include several separate data tables, databases, or other data storage mechanisms and media for storing data relating to a particular aspect. For example, the data plane 610 illustrated includes mechanisms for storing geographic map data 612 and user information 616, which can be used to serve content. The data plane 610 is also shown to include a mechanism for storing log data 614, which can be used for purposes such as reporting and analysis. The data plane 610 is operable, through logic associated therewith, to receive instructions from the map server 608 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 6. Thus, the system 600 in FIG. 6 is provided merely as one example, and does not limit the scope of the disclosure.

Figure 7:
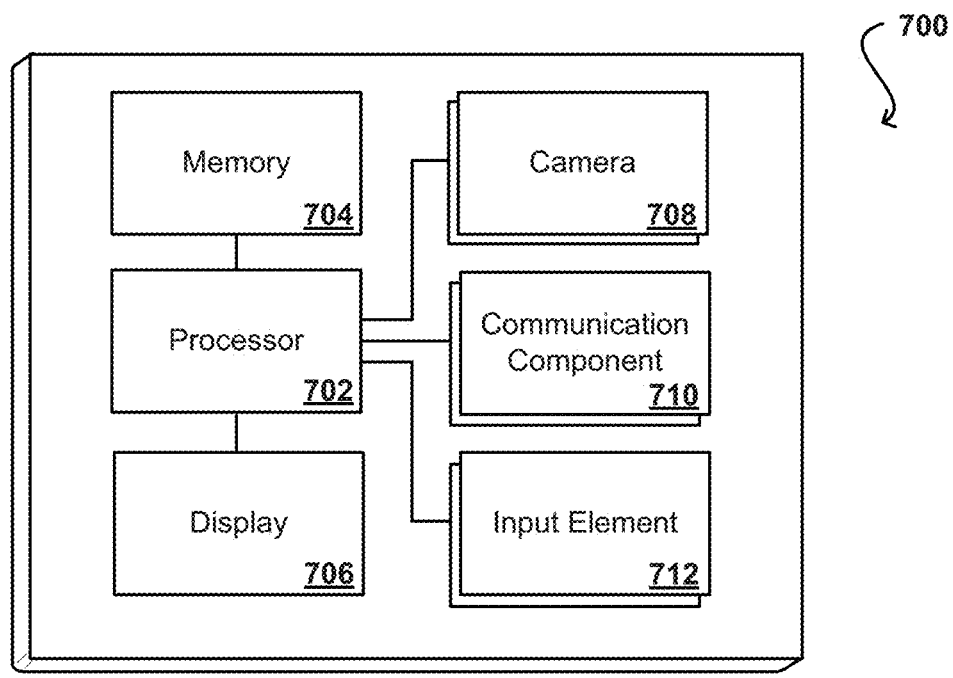
FIG. 7 illustrates a logical arrangement of a set of general components of an example computing device.

FIG. 7 illustrates a logical arrangement of a set of general components of an example computing device 700 such as the device 602 described in reference to FIG. 6. In this example, the device includes a processor 702 for executing instructions that can be stored in a memory device or element 704. The device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. Although not explicitly shown, in some embodiments the computing device 702 may include more than one processor in addition to the processor 702 and may include another type of processor such as a graphics processing unit (GPU) to provide additional functionality and/or processing capability. As discussed, the device in many embodiments will include at least one image capture element 708 such as a camera or infrared sensor that is able to image projected images or other objects in the vicinity of the device. Methods for capturing images or video using a camera element with a computing device will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also can (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
determining a polygon that bounds a geographic feature included in an interactive geographic map, wherein the geographic feature comprises a state or country;
determining a set of points that comprises a perimeter of the polygon;
reducing the determined set of points of the perimeter of the polygon into a reduced set of points based on a line simplification algorithm, wherein the reducing includes discarding a subset of points from among the determined set of points, wherein distance of each point, in the subset of points, from a first line connecting two respective endpoints is below a tolerance distance, the two respective endpoints comprising a starting point and an ending point of the subset of points;
dividing a first value of the area of the polygon by a second value of the perimeter of the polygon to determine a first radial distance value;
creating an intermediate buffer zone for the polygon, wherein creating the intermediate buffer zone comprises extending inwards, by the first radial distance value, from the reduced set of points to a center of the polygon to form a respective perimeter of the intermediate buffer zone;
dividing a value of the area of the intermediate buffer zone by a value of the perimeter of the intermediate buffer zone to determine a second radial distance value;
reducing the area, based on the reduced set of points, of the polygon by creating an inner buffer zone for the polygon, wherein creating the inner buffer zone comprises extending inwards, by the second radial distance value, from the perimeter of the intermediate buffer zone to the center of the polygon to form a respective perimeter of the inner buffer zone, and the inner buffer zone comprises a smaller area within the area of the polygon corresponding to a center of the polygon;
determining that a third value of an area of the inner buffer zone is less than or equal to a fourth value of a minimum threshold area;
determining a centroid of the inner buffer zone; and
including a label at the centroid of the inner buffer zone in map data, the label having text or graphical data describing the geographic feature.

2. The computer-implemented method of claim 1, further comprising:
responsive to determining that the third value is greater than the fourth value, repeating the step of reducing an area of the polygon by creating a respective inner buffer zone for the polygon until a respective area of the respective inner buffer zone is less than or equal to the minimum threshold area.

3. A system comprising:
a processor; and
a memory device including instructions that, when executed by the processor, cause the processor to:
identify a geographic feature included in an map;
determine a polygon that bounds the geographic feature;
determine a first radial distance value by dividing a first area of the polygon by a first value of a perimeter of the polygon;
extend inwards, by the first radial distance value, from the perimeter of the polygon to a center of the polygon to form a perimeter of an intermediate region;
determine a second radial distance value by dividing a second area of the intermediate region by a second value of a perimeter of the intermediate region;
extend inwards, by the second radial distance value, from the perimeter of the intermediate region to the center of the polygon to form a perimeter of an inner region having a third are;
determine that the third area of the inner region is less than or equal to a threshold area;
determine a center point of the inner region of the polygon; and
place a label at the center point of the inner region of the polygon.

4. The system of claim 3, wherein the instructions further cause the processor to:
determine a set of points that comprises the perimeter of the polygon; and
reduce the determined set of points of the perimeter of the polygon.

5. The system of claim 4, wherein to reduce the determined set of points of the perimeter of the polygon further causes the processor to:
discard a subset of points from among the determined set of points.

6. The system of claim 5, wherein:
distance of each point, in the subset of points, from a first line connecting two respective endpoints is below a tolerance distance, the two respective endpoints comprising a starting point and an ending point of the subset of points.

7. The system of claim 3, wherein the instructions further cause the processor to:
determine a centroid of the inner region;
place the label at the centroid of the inner region; and
provide the map including the label at the centroid of the inner region.

8. The system of claim 3, wherein the label includes text or graphical data describing the geographic feature.

9. The system of claim 3, wherein the instructions further cause the processor to:
   determine that the polygon is a partial polygon, wherein the partial polygon does not include at least a portion of the geographic feature;
   determine a first shape centered within the polygon;
   determine a first set of points associated with a first portion of the perimeter of the polygon where the first portion is within the first shape;
   determine a second set of points associated with a perimeter of the first shape where a second portion of the perimeter of the polygon is outside of the first shape;
   determine a second perimeter of the polygon including the first set of points and the second set of points; and
   substitute the second perimeter for the perimeter of the polygon.

10. The system of claim 9, wherein the instructions further cause the processor to:
    determine a first corner corresponding to a top left of the polygon;
    determine a second corner corresponding to a bottom left of the polygon;
    determine a third corner corresponding to a bottom right of the polygon;
    determine a fourth corner corresponding to a top right of the polygon;
    determine a first line between the first corner and the third corner;
    determine a second line between the second corner and the fourth corner; and
    center the first shape at the intersection of the first line and the second line.

11. The system of claim 9, wherein the instructions further cause the processor to:
    determine a center point of the first shape;
    determine a first offset in a first direction;
    determine a second offset in a second direction perpendicular to the first direction; and
    determine a perimeter of the first shape using the center point, the first offset and the second offset.

12. A non-transitory computer-readable medium including instructions stored therein that, when executed by at least one computing device, cause the at least one computing device to:
    identify a geographic feature included in an map;
    determine a polygon that bounds the geographic feature;
    determine a first radial distance value by dividing a first area of the polygon by a first value of a perimeter of the polygon;
    extend inwards, by the first radial distance value, from the perimeter of the polygon to a center of the polygon to form a perimeter of an intermediate region;
    determine a second radial distance value by dividing a second area of the intermediate region by a second value of a perimeter of the intermediate region;
    extend inwards, by the second radial distance value, from the perimeter of the intermediate region to the center of the polygon to form a perimeter of an inner region having a third area;
    determine that the third area of the inner region is less than or equal to a threshold area;
    determine a center point of the inner region of the polygon; and
    place a label at the center point of the inner region of the polygon.

13. The non-transitory computer-readable medium of claim 12, wherein the instructions further cause the at least one computing device to:
    determine a set of points that comprises the perimeter of the polygon; and
    reduce the determined set of points of the perimeter of the polygon.

14. The non-transitory computer-readable medium of claim 13, wherein to reduce the determined set of points of the perimeter of the polygon further causes the at least one computing device to:
    discard a subset of points from among the determined set of points.

15. The non-transitory computer-readable medium of claim 14, wherein:
    distance of each point, in the subset of points, from a first line connecting two respective endpoints is below a tolerance distance, the two respective endpoints comprising a starting point and an ending point of the subset of points.

16. The non-transitory computer-readable medium of claim 12, wherein the instructions further cause the at least one computing device to:
    determine that the polygon is a partial polygon, wherein the partial polygon does not include at least a portion of the geographic feature;
    determine a first shape centered within the polygon;
    determine a first set of points associated with a first portion of the perimeter of the polygon where the first portion is within the first shape;
    determine a second set of points associated with a perimeter of the first shape where a second portion of the perimeter of the polygon is outside of the first shape;
    determine a second perimeter of the polygon including the first set of points and the second set of points; and
    substitute the second perimeter for the perimeter of the polygon.

17. The non-transitory computer-readable medium of claim 16, wherein the instructions further cause the at least one computing device to:
    determine a first corner corresponding to a top left of the polygon;
    determine a second corner corresponding to a bottom left of the polygon;
    determine a third corner corresponding to a bottom right of the polygon;
    determine a fourth corner corresponding to a top right of the polygon;
    determine a first line between the first corner and the third corner;
    determine a second line between the second corner and the fourth corner; and
    center the first shape at the intersection of the first line and the second line.

18. The non-transitory computer-readable medium of claim 16, wherein the instructions further cause the at least one computing device to:
    determine a center point of the first shape;
    determine a first offset in a first direction;
    determine a second offset in a second direction perpendicular to the first direction; and
    determine a perimeter of the first shape using the center point, the first offset and the second offset.

* * * * *